March 11, 1947.　　R. CRAIG ET AL　　2,417,392
TORSION BALANCE
Filed May 8, 1944　　2 Sheets-Sheet 1

INVENTORS
RODERICK CRAIG
ROBERT Q. BOYER
BY
ATTORNEY.

March 11, 1947. R. CRAIG ET AL 2,417,392
TORSION BALANCE
Filed May 8, 1944 2 Sheets-Sheet 2
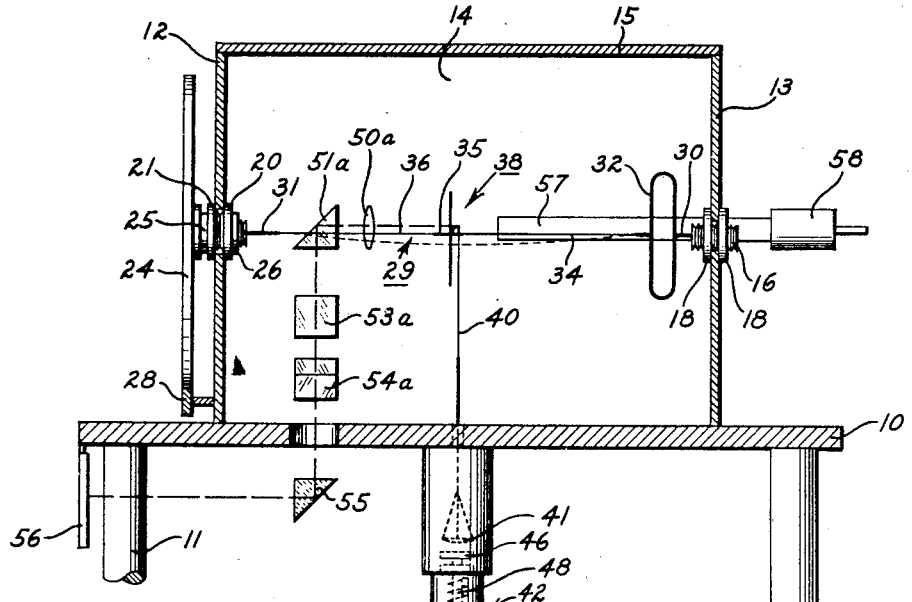
Fig. 2
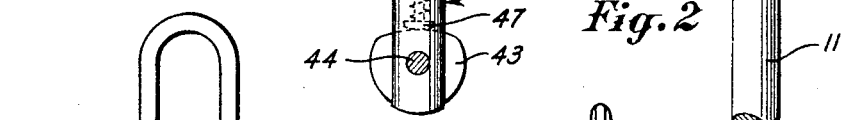
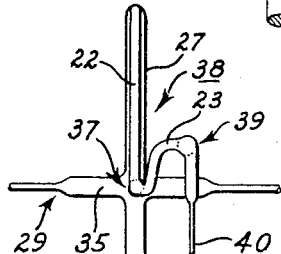
Fig. 3
Fig. 5
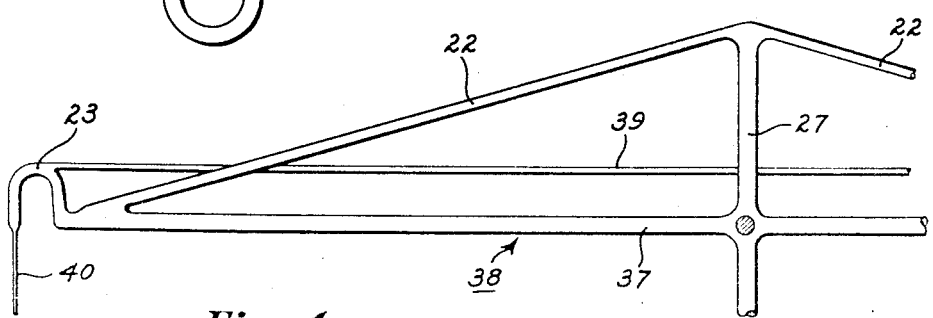
Fig. 4
INVENTORS
RODERICK CRAIG
ROBERT Q. BOYER
BY
ATTORNEY.

Patented Mar. 11, 1947

2,417,392

UNITED STATES PATENT OFFICE 2,417,392

TORSION BALANCE

Roderick Craig and Robert Q. Boyer, Berkeley, Calif., assignors to the Government of the United States, as represented by the Director of the Office of Scientific Research and Development, Office of Emergency Management Application May 8, 1944, Serial No. 534,629

12 Claims. (Cl. 88—24)

This invention relates to torsion balances, and more particularly to a torsion balance having an improved optical system for viewing the beam so that the condition of balance may be accurately ascertained.

It is well known that torsion balances are widely employed for the precision measurement of weight. In general, such balances comprise a frame having a generally horizontal elastic strand, wire or other torsion member stretched thereon, a transverse beam secured to the member and weighing pans attached to either end of the beam. An unknown weight is measured by first bringing the unloaded balance to a zero reading by rotation of one end of the torsion member until the transverse beam rotates to a position making a zero reading with respect to a scale, which beam position is preferably horizontal. A standard weight is then placed in one pan and the unknown weight in the other. The difference in weight between the standard and unknown is measured by again rotating one end of the torsion member so that the torsional forces overcome the difference of weight until a condition of balance is reached that is determined when the beam becomes exactly registered with the zero reading of the balance scale. The amount of rotation of the torsion member is a direct measure of the difference in weight between the unknown and the standard. The weight-to-torsion ratio is measured by previous empirical calibration of the elastic torsion characteristics of the torsion member with respect to a known weight.

The torsion member is usually made of quartz for extremely accurate work, such as weights in the order of $10^{-7}$ milligrams. These quartz strands are made in a manner similar to the method used for glass, such as heating a quartz rod to a plastic state and then manually pulling the ends apart until an extremely fine thread or strand is produced. Quartz is much more suitable for this purpose than metals, inasmuch as the elastic deformation of quartz relative to its original condition is generally about fifty times greater than that for metals. Since the present invention relates to high precision balances having an accuracy of $1 \times 10^{-7}$ milligrams, the invention will be described as applied to a quartz strand torsion balance.

A torsion balance differs from most balances in that the pivot point for the weighing beam is displaced by the weight imposed on the beam. For example, an ordinary lever balance has a fixed pivot point about which the lever rotates. In a torsion balance, however, the pivot point is the point of suspension of the transverse beam on the generally horizontal torsion strand, and as the standard and unknown weights are increased the tension forces imposed upon the torsion member cause it to stretch and drop the pivot point. Further, errors arise in conventional torsion balances due to nonconcentric alignment of the torsion fiber with its torsion applying elements, causing a lateral displacement as well as a vertical displacement of the pivot point; whereby the end of the torsion fiber to which the torsion applying elements are connected revolves in an orbit of small dimensions as it is rotated incident to operation of these elements to apply torsion to the fiber. These factors have caused inaccuracies in prior balances because of relative movement between different parts of indicating systems.

The present invention provides an accurate means for indicating a state of balance of the beam inasmuch as it is independent of the amount of sag produced by loading. This is accomplished, not by measuring the rotation relative to a pivot point, but rather by measuring rotation relative to respective portions of the beam on either side of the pivot. Therefore, the sag of the beam merely displaces both measurements an equal amount and does not introduce an error. Preferably, the invention comprises the combination with a torsion balance of an optical system which projects an image of portions of a weighing beam on opposite sides of a pivot, and imposes these images on a common screen or other optical device so that their relationship may be visually and readily determined.

It is therefore an object of the invention to provide a torsion balance having an optical system which measures a state of balance regardless of the amount of sag of the torsion member.

Another object of the invention is to provide a torsion balance that accurately records the state of balance regardless of lateral displacements of the weighing beam.

Another object of the invention is to provide a rotation measuring device wherein the relative displacement of the optical projections of a rotatable member indicates the angle of rotation from a reference position.

A further object of the invention is to provide a torsion balance having an optical system wherein portions of the weighing beam may be viewed at a common point so that their relative positions will become readily apparent.

Still another object of the invention is to provide a torsion balance having an optical system which focuses images of portions of the weighing beam upon a common viewing screen so that the state of balance of the beam may be readily ascertained by an inspection of the images on a comparator basis.

Further objects and advantages of the invention will be apparent in the following description and claims.

In the drawings forming a part of this specification;

Figure 2 is an elevation view of the balance of Figure 1 taken along the line 2—2 of that figure;

Figure 3 is an enlarged elevation view on an exaggerated scale of the bow of the torsion structure of the balance of Figure 1;

Figure 4 is an enlarged elevation view on an exaggerated scale of the transverse beam of the balance of Figure 1; and Figure 5 is a side view of the transverse beam of Figure 4.

Figure 1:
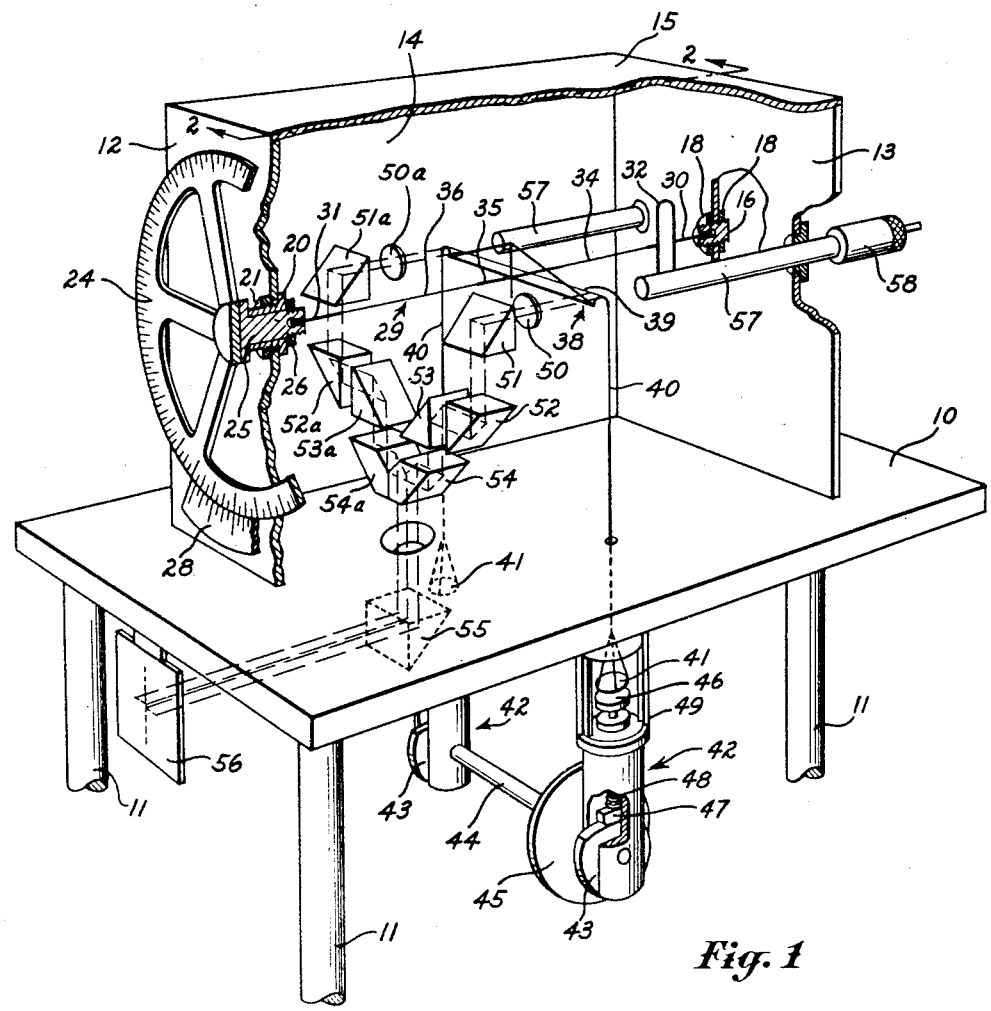
Figure 1 is a perspective view, partly in section, of a simplified torsion balance incorporating the invention.

Referring to Figures 1 and 2 of the drawings, a base 10 is supported by legs 11, and has secured thereto a box-like structure forming a frame for a torsion structure and having end walls 12 and 13, side walls such as a wall 14, and a top 15. Mounted in the wall 13 is a threaded anchor member 16 secured to the wall by locknuts 18. Mounted in end wall 12 is a bushing 20, secured by locknut 21. Supported in bushing 20 is a torsion wheel 24 having a shaft 25 held in the bushing by a nut 26. The wheel 24 has a scale on the outer face which registers with a stationary scale 28 to give vernier readings of angular measurement.

The torsion structure of the balance includes a horizontal torsion strand 29 and a transverse beam 38. The torsion strand includes relatively large quartz strand sections 30 and 31, cemented to the threaded anchor member 16 and the wheel shaft 25 respectively, and these sections may be of the order of 400 microns or .4 millimeter in diameter. An oval-shaped bow 32 of quartz strand is attached to quartz section 30 to provide an extremely elastic tensioning element. Connected between bow 32 and section 31 are relatively fine sections 34 and 36 of quartz strand, about 25 microns or .025 millimeter in diameter, and a relatively large center section 35. The triangularly shaped transverse beam 38, likewise of quartz, is secured to center section 35, and includes a fine quartz indicator fiber 39, the image or shadow of which is used for determining the zero reading position of rotation of the beam 38. Suspended from either end of beam 38 are support strands 40, supporting weighing pans 41, preferably made of platinum.

The transverse beam 38 is shown in more detail in Figures 4 and 5. The entire beam structure is made of quartz strands of varying thickness and is a truss structure formed substantially in a vertical plane. The beam 38 includes a horizontal main beam 37, the diameter of which may be about 200 microns and which is fused to the torsion center section 35 (Figure 2) at its center. Fused to either end of beam 37 are weight assuming means in the form of inverted U members 23 to which the support strands 40 are secured, and these inverted members are likewise about 200 microns in diameter compared to the diameter of support strands 40 which may be about 5 microns in diameter. The main beam 37 forms part of a structural A truss including an upright compression member 27 having two stringers or tension members 22 fused to the top thereof and having their outer ends fused to the main beam 37 near the point of attachment of the inverted U members 23. The indicator strand 38 is fused to the upper portions of the inverted U members 23, and is out of contact with the truss members because the members 23 are depressed rearwardly of the plane of the truss, as shown in Figure 5.

The bow 32 is shown in detail in Figure 3, and it will be noted that it is made of a relatively heavy quartz strand which may be of the order of 400 microns. The bow is a closed loop substantially oval in shape and may be held in a vertical plane. The various parts of the torsion structure are fused to the bow on opposite sides near the center of the oval shape.

Referring again to Figures 1 and 2, the bottom of base plate 10 supports tubular members 42 which support a cam shaft 44 having a thumb wheel 45 mounted thereon. The shaft 44 drives flatted cam wheels 43 each of which is engaged by a spring biased shoe 47 secured to a lift rod 48 which raises and lowers pan arrests 46 to which the rods are secured. Pan arrests 46 relieve the load on the torsion structure when the balance is being loaded, and also limit the amount of rotation of the beam 38. The weighing pans 41 are situated below the base plate 10 and in tubular members 42, so that the box structure on base plate 10 may be kept closed to exclude dust which might otherwise affect the balance. Tubular members 42 are provided with rotating doors 49 to exclude dust and air currents which might upset the balance during operation.

The structure thus far described comprises an operative torsion balance. An optical system for determining the balanced or zero setting condition of the transverse beam 38 will now be described. Positioned in end wall 13 are light-transmitting rods 57 of quartz or "Lucite," which project substantially parallel light beams from light sources 58 which may include an incandescent filament suitably energized, as by a battery (not shown). The diameter of rods 57 is preferably about twice as great as the expected sag in the torsion member when subjected to the maximum load. These rods therefore project light into a region which will be traversed by the indicator strand 39 during operation of the balance.

The indicator strand 39 creates a dark line or shadow in the light projected from rods 57. This light is received by a pair of objective lenses 50 and 50a, and is transmitted to a pair of right-angle reflecting prisms 51 and 51a. The light beams are then transmitted to pairs of prisms 52 and 52a, 53 and 53a, and 54 and 54a, until the light rays are brought into juxtaposition. A right-angle reflecting prism 55 transmits the light to a ground glass screen 56 secured to base plate 10. By placing screen 56 in the image plane of objective lenses 50 and 50a, an image of the illuminated portions of strand 39 will be formed on the screen. The entire optical system therefore constitutes a projecting means for images or other representations of the beam 38. In this connection it is noted that a shadow and a lens image are both generally designated as an "image." The invention contemplates the use of both types of images, and when a shadow alone is employed, the objective lenses 50 and 50a are not strictly necessary.

The operation of the apparatus embodying the invention is as follows: The unloaded balance is brought to a balance condition by operating the hand wheel 24 until a zero setting position of the beam is achieved. This is determined optically by light supplied by rods 57, the parallel beams of which are cut by the extremely fine indicator strand 39 on beam 38. An image of each of the two lighted portions of the strand 39 is transmitted by lenses 50 and 50a through the duplicate prism systems 51 and 51a, 52 and 52a, 53 and 53a, and 54 and 54a, which brings the two images into parallel juxtaposition. The light rays are then reflected by prism 55 to the ground glass screen where the images of the two portions of strand 39 will appear as two horizontal lines, the adjacent ends of which are preferably separate so that they do not overlap, but are nevertheless close enough for accurate visual comparison. The end-to-end alignment of the two images is controlled by the prisms 54 and 54a, and in the present embodiment a substantially exact end-to-end alignment is achieved. The zero setting occurs when the two images on screen 56 are exactly opposite each other so that a single straight horizontal line could be passed through them. This alignment occurs only when the indicator strand is perfectly aligned with the prism system, the two branches of which should be substantially optically identical.

The reading on the scale of the hand wheel 24 which corresponds to the zero reading thus obtained is noted. The thumb wheel 45 is then rotated until pan arrests 46 support weighing pans 41. A standard weight is placed in the one pan and the weight to be measured is placed in the other, after which the pan arrests 46 are backed off. The beam 38 will then tilt in one direction or the other depending upon which weight is the greater. The difference in weight between the two is assumed principally by the torsion section 36 of the torsion strand 29, which occurs when the hand wheel 24 is rotated in the proper direction to apply torsion to the strand section 36. This difference in weight is measured directly as the amount of rotation of wheel 24 necessary to bring the beam 38 back to its zero setting, which is determined when the two images on screen 56 are again end to end.

The varying amounts of sag of the torsion member 29, which may assume a condition like that shown by the broken line in Figure 2 due to different total weights imposed, do not affect the accuracy of the determination of the state of balance. The only effect is to raise or lower the position of both images on screen 56. This advantage results from the fact that the condition of balance is determined, not by reference to a standard horizontal line, but by referring the images or projections of the indicator strand 39 to each other. Thus one image serves as the reference for the other and the condition of balance is obtained when both images become aligned so that they appear to be coincidental with a single, horizontal, straight line which might be passed through them.

While only one embodiment of the invention is shown, it is not limited to this structure. For example, the lens image may be formed in space and viewed by an ocular lens or telescopic eyepiece. It is not necessary to employ a standard weight as the entire weight of an unknown may be assumed by torsional forces. Also, any suitable optical system may be employed to obtain projections of the image, and to converge the projections to a close relationship. The torsion structure need not be made of quartz, as any suitable metal or other material would result in an operative balance. Nor is the invention limited in any way except to the terms of the following claims.

What is claimed is:

1. A device comprising a pivoted beam whose angular departure from a reference position is to be measured and having a yieldable, horizontally suspended pivot support that is subject to vertical displacement and also having portions projecting transversely on either side of the pivot support, means for projecting individual images of the respective portions of the beam into positions dependent upon the relation of the portions to the projecting means, and means for comparing the positions of the individual images relative to each other.

2. In a device for measuring rotation of a beam having a yieldable horizontally suspended pivot support which is subject to vertical displacement an optical system including separate image forming means for gathering light along the pivot support from portions of the beam extending transversely on both sides of the pivot support, reflecting means for directing the light from the portions to a common plane, and means for rendering the light at the plane viewable as images of the transversely extending portions, whereby the angle of rotation of the beam may be determined by the displacement of the image of one transversely extending portion relative to the other.

3. A balance comprising a horizontal torsion member, a beam secured transversely thereto having portions projecting from either side of the torsion member, a source of light on one side of the beam for illuminating the beam portions, separate means positioned on the other side of the beam and spaced from the light source for producing individual indications of the illuminated beam portions, and means for comparing the individual indications with each other.

4. A balance comprising a generally horizontal torsion member, a beam secured transversely thereto having a plurality of portions, means for projecting a corresponding plurality of images of the beam, and means for rendering the projected images visible for comparison with each other.

5. A balance comprising a horizontal torsion member, a beam secured transversely thereto having portions extending from opposite sides of the torsion member, means for projecting along the torsion member images of the respective beam portions, and means for rendering the images visible.

6. A balance comprising a horizontal torsion member, a beam secured transversely thereto having portions extending from opposite sides of the torsion member, means for projecting along the torsion member images of the respective beam portions, means for aligning the images in juxtaposition, and means for rendering the images visible.

7. A torsion balance comprising a frame, rotatable means mounted on the frame, a horizontal torsion member secured to the frame and to the rotatable means, a beam secured transversely to the torsion member and having portions projecting from opposite sides thereof, weight supporting means attached to the beam, optical means for projecting along the torsion member images of the respective beam portions, and means for making the projections visible to an observer.

8. A torsion balance comprising a frame, rotatable means mounted on the frame, a torsion member secured to the frame and to the rotatable means, a transverse beam secured to the torsion member having portions projecting from either side thereof and adapted to support a weight on at least one portion, optical means including objective lenses for gathering light from the region of the portions of the beam, prism means to converge the light rays from the viewing means into juxtaposition, and a ground glass viewing screen upon which the respective images of the portions of the beam are focused.

9. A torsion balance comprising a frame, rotatable means mounted on the frame, a torsion member secured to the frame and to the rotatable means, a transverse beam secured to the torsion member having portions projecting from opposite sides thereof and adapted to support a standard weight at one portion and an unknown weight at the other portion, optical means including objective lenses to gather light from the portions of the beam, a ground glass viewing screen secured to the frame, and optical means to impose the images of the portions of the beam in juxtaposition on the screen.

10. A torsion balance comprising a frame, rotatable means mounted on the frame, a torsion member secured to the frame and to the rotatable means, a transverse beam secured to the torsion member having portions projecting from either side thereof and at least one portion being adapted to support a weight, a viewing screen, and optical means for controlling and converging light along the torsion member from the beam portions into individual images in juxtaposition on the screen.

11. A torsion strand for a torsion balance comprising a central section of rugged construction such that a beam may be secured thereto, fine torsion strands secured to either end of the center section, one of which is adapted to assume torsional stresses of the order desired and the other adapted to offer torsional resistance not substantially in excess of the one, a bow secured to the extreme end of the other torsion strand, and terminal sections substantially inflexible compared to the fine strands, connected respectively to the one fine strand and to the bow.

12. In a torsion balance, a transverse beam comprising a structural truss, weight assuming means attached to each end of the truss and having portions in a vertical plane different from the plane of the truss, and an indicator strand connecting the weight assuming means and placed in their plane.

RODERICK CRAIG.
ROBERT Q. BOYER.

REFERENCES CITED

The following references are of record in the file of this patent:

UNITED STATES PATENTS

| Number | Name | Date |
| --- | --- | --- |
| 1,579,273 | Wright | Apr. 6, 1926 |
| 2,131,738 | Hoyt | Oct. 4, 1938 |
| 2,232,177 | Ide | Feb. 18, 1941 |
| 1,893,421 | Latzko et al. | Jan. 3, 1933 |
| 2,155,248 | Adams et al. | Apr. 18, 1939 |
| 1,424,556 | Cooke | Aug. 1, 1922 |
| 2,150,398 | Paulson | Mar. 14, 1939 |
| 1,977,027 | Vaughn | Oct. 16, 1934 |
| 1,670,310 | Miller | May 22, 1928 |
| 2,075,625 | Roux et al. | Mar. 30, 1937 |